United States Patent [19]

Desmond et al.

[11] Patent Number: 4,582,693

[45] Date of Patent: Apr. 15, 1986

[54] SYNTHESIS OF SILICA MOLECULAR SIEVES USING SYNTHESIS DIRECTING ORGANIC DYES

[75] Inventors: Michael J. Desmond, Cleveland Hts.; Frederick A. Pesa, Aurora; Janie K. Currie, Novelty, all of Ohio

[73] Assignee: The Standard Oil Company, Cleveland, Ohio

[21] Appl. No.: 672,406

[22] Filed: Nov. 16, 1984

[51] Int. Cl.$^4$ .................. C01B 33/28; B01J 21/08
[52] U.S. Cl. .................. 423/329; 423/326; 423/328; 423/335; 423/339; 502/232; 502/77
[58] Field of Search .................. 502/77, 232; 423/328, 423/329, 335, 326

[56] References Cited

U.S. PATENT DOCUMENTS

| | | | |
|---|---|---|---|
| 4,388,285 | 6/1983 | Rankel et al. | 423/329 |
| 4,430,314 | 2/1984 | Audeh et al. | 423/326 |
| 4,481,174 | 11/1984 | Baack et al. | 423/306 |

FOREIGN PATENT DOCUMENTS 2125390 3/1984 United Kingdom ............... 423/328

OTHER PUBLICATIONS

*The Merck Index* eighth edition Merck & Co Inc. Rahway, NJ. 1968 p. 687.

*Primary Examiner*—John Doll
*Assistant Examiner*—Jackson Weeds
*Attorney, Agent, or Firm*—Larry W. Evans; Joseph G. Curatolo; Sue E. McKinney

[57] ABSTRACT

A method is disclosed for making a silica molecular sieve comprising:

(A) providing a mixture comprising: water; an oxide, hydroxide or alkoxide of silicon; a mineralizing agent; and a synthesis directing nitrogen containing organic dye; and (B) maintaining said mixture at a temperature of about 80° C. to about 300° C. for an effective period of time to provide said silica molecular sieve.

38 Claims, No Drawings

SYNTHESIS OF SILICA MOLECULAR SIEVES USING SYNTHESIS DIRECTING ORGANIC DYES

TECHNICAL FIELD

This invention relates to molecular sieves and, more particularly, to silica molecular sieves. Specifically, this invention relates to a method for making silica molecular sieves using nitrogen containing organic dyes as synthesis directing agents.

BACKGROUND OF THE INVENTION

The term "molecular sieve" refers to a wide variety of positive ion containing crystalline materials of both natural and synthetic varieties which exhibit the property of acting as sieves on a molecular scale. A major class of molecular sieves are crystalline aluminosilicates, although other crystalline materials are included in the broad definition. Examples of such other crystalline materials include coal, special active carbons, porous glass, microporous beryllium oxide powders, and layer silicates modified by exchange with organic cations. See, D. W. Breck, "Zeolite Molecular Sieves: Structure, Chemistry, and Use", John Wiley & Sons, 1974.

Zeolites are crystalline, hydrated, framework aluminosilicates which are based on a three-dimensional network of $AlO_4$ and $SiO_4$ tetrahedra linked to each other by sharing all of the oxygens.

Zeolites may be represented by the empirical formula

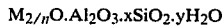

$$M_{2/n}O \cdot Al_2O_3 \cdot xSiO_2 \cdot yH_2O$$

wherein, x is generally equal to or greater than 2 since $AlO_4$ tetrahedra are joined only to $SiO_4$ tetrahedra, and n is the cation valence. The framework contains channels and interconnected voids which are occupied by the cation, M, and water molecules. The cations may be mobile and exchangeable, to varying degrees, by other cations. Intracrystalline zeolitic water in many zeolites is removed continuously and reversibly. In many other zeolites, mineral and synthetic, cation exchange or dehydration may produce structural changes in the framework. Ammonium and alkylammonium cations may be incorporated in synthetic zeolites, e.g., $NH_4$, $CH_3NH_3$, $(CH_3)_2NH_2$, $(CH_3)_3NH$, and $(CH_3)_4N$. In some synthetic zeolites, aluminum cations may be substituted by gallium ions and silicon ions by germanium or phosphorus ions. The latter necessitates a modification of the structural formula.

The structural formula of a zeolite is best expressed for the crystallographic unit cell as: $M_{x/n}[(AlO_2)_x(SiO_2)_y] \cdot wH_2O$ where M is the cation of valence n, w is the number of water molecules and the ratio y/x usually has values of 1-100 depending upon the structure. The sum (x+y) is the total number of tetrahedra in the unit cell. The complex within the [] represents the framework composition.

The zeolites described in the patent literature and published journals are designated by letters or other convenient symbols. Exemplary of these materials are Zeolite A (U.S. Pat. No. 2,882,243), Zeolite X (U.S. Pat. No. 2,882,244), Zeolite Y (U.S. Pat. No. 3,130,007), Zeolite ZSM-5 (U.S. Pat. No. 3,702,886), Zeolite ZSM-11 (U.S. Pat. No. 3,709,979), and Zeolite ZSM-12 (U.S. Pat. No. 3,832,449).

Although there are 34 species of zeolite minerals and about 100 types of synthetic zeolites, only a few have been found to have practical significance. Many of the zeolites, after dehydration, are permeated by very small channel systems which are not interpenetrating and which may contain serious diffusion blocks. In other cases dehydration irreversibly disturbs the framework structure and the positions of metal cations, so that the structure partially collapses and dehydration is not completely reversible. To be efficiently used as a molecular sieve, the structure of the zeolite after complete dehydration must remain intact.

There has been considerable interest in developing metallosilicates other than aluminosilicates which exhibit molecular sieve characteristics. For example, U.S. Pat. Nos. 3,329,480 and 3,329,481 disclose crystalline zircano-silicates and titano-silicates, respectively. U.S. Pat. No. 3,329,384 discloses group IV-B metallosilicates. U.S. Pat. Nos. 4,208,305, 4,238,315 and 4,337,176 disclose iron silicates. U.S. Pat. No. 4,329,328 discloses zinco-, stanno-, and titano-silicates. European patent applications 0 038 682 and 0 044 740 disclose cobalt silicates. European patent application 0 050 525 discloses nickel silicate.

U.K. patent application GB 2,024,790 A discloses a silica-based material which has been modified with one or more elements which have entered the crystalline lattice of the silica in place of silicon atoms of the silica or in the form of salts of bisilicic or polysilicic acids. The elements identified as being suitable for making such silica-based materials are chromium, beryllium, titanium, vanadium, manganese, iron, cobalt, zinc, zirconium, rhodium, silver, tin, antimony and boron.

U.S. Pat. No. 4,299,808 discloses chromosilicates formed by reacting an aqueous mixture of an oxide of silicon, a compound of chromium, a hydroxide of an alkali or an alkaline earth metal, and an alkylammonium cation or a precursor of an alkylammonium cation.

U.S. Pat. Nos. 3,769,386, 4,192,778 and 4,339,354 relates to rare earth metal containing silicates. U.S. Pat. No. 3,769,386 discloses zeolitic alumino-metallosilicates crystallized from an aqueous reaction mixture containing $Na_2O$, $SiO_2$, $Al_2O_3$ and $R_{2/n}$ wherein R is Mg, Ca, Y, Fe, Co, Ni or a rare earth metal and n is the valence of R. U.S. Pat. No. 4,192,778 discloses rare earth exchanged zeolites of the faujasite type in which the equivalent of Na is less than 0.1 and the rare earth is at least 0.9 equivalents per gram atom of aluminum. U.S. Pat. No. 4,339,354 discloses a catalyst comprising a crystalline aluminosilicate such as zeolite Y, an inorganic matrix, and discrete particles of alumina, the catalyst having specified alkali metal and rare earth metal contents.

The term "silica molecular sieve" refers to molecular sieves of silica that do not contain framework aluminum or other framework metal, except for such aluminum or other metal that may be present as impurities. By definition these molecular sieves are not zeolites, aluminosilicates or metallosilicates. An example of a silica molecular sieve is silicalite which topologically resembles ZSM-5 and contains the same type of building unit. After synthesis and calcination, the inert cell of 96 $SiO_2$ tetrahedra has a pore volume of 0.32 $cm^3/cm^3$. The structure of silicalite consists of sheets of hexagonal $SiO_4$ rings, three layers wide extending in one direction, which are cross-linked by two $SiO_4$ units. U.S. Pat. No. 4,061,724 discloses crystalline silica compositions.

Synthesis directing agents are agents which when added to a reaction mixture effect a different crystalline structure than that which would occur but for the addition of such agent, or result in the formation of a crystalline structure wherein an amorphous mixture would otherwise remain. Examples of conventional agents that are currently in use include ammonium and tetrapropyl ammonium ions, and alkyl phosphonium and alkyl arsonium ions. See, L. D. Rollman, "Templates in Zeolite Crystallization", *Adv. Chem. Ser.*, 173, 387 (1979).

U.S. Pat. No. 4,018,870 discloses the use of certain nitrogen containing dyes including methyl violet and methylene blue in the synthesis of zeolites. This patent indicates that these dyes are used to suppress the formation of unwanted zeolites during the manufacture of more desirable products.

It would be advantageous to employ nitrogen containing organic dyes as synthesis directing agents in the synthesis of silica molecular sieves.

SUMMARY OF THE INVENTION

The present invention relates to a method for making silica molecular sieves using nitrogen containing organic dyes as synthesis directing agents. Broadly stated, the present invention contemplates the provision of a method for making a silica molecular sieve comprising:

(A) providing a mixture comprising: water; an oxide of silicon source; a mineralizing agent; and a synthesis directing nitrogen containing organic dye; and (B) maintaining said mixture at a temperature of about 80° C. to about 300° C. for an effective period of time to provide said silica molecular sieve.

DETAILED DESCRIPTION OF THE PREFERRED EMBODIMENT

The silica molecular sieves made by the process of the present invention are in the form of layered $SiO_2$ tetrahedra. These crystalline structures can be represented in terms of mole ratios of oxides by the formula

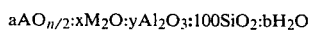

$$aAO_{n/2}:xM_2O:yAl_2O_3:100SiO_2:bH_2O$$

wherein

A is the cation of said nitrogen containing organic dye;

M is an alkali metal, preferably Na or K, and more preferably Na;

a is from about zero to about 2, preferably from zero to about 1;

n is the cationic charge of A, which is preferably in the range of 1 to 4;

b is from about 20 to about 90, preferably about 30 to about 80;

x is from zero to about 15, preferably about 2 to about 10; and y is from zero to about 2, preferably from zero to about 0.5.

The X-ray diffraction patterns for these crystalline structures show at least the following significant lines:

| Interplanar Spacing d(A) | Relative Intensity |
|---|---|
| 15.65 ± 0.2 | v.s. |
| 7.78 ± 0.1 | w. |
| 5.18 ± 0.06 | m. |
| 3.64 ± 0.04 | w.-m. |
| 3.56 ± 0.04 | w.-m. |
| 3.44 ± 0.04 | s.-v.s. |
| 3.31 ± 0.03 | m.-s. |
| 3.15 ± 0.03 | m.-s. |

The values were determined by standard techniques. The relative intensities are given in terms of symbols: v.s.=very strong, s.=strong, m=medium, and w.=weak.

In a preferred embodiment the X-ray diffraction patterns for these crystalline structures show at least the following significant lines:

| Interplanar Spacing d(A) | Relative Intensity |
|---|---|
| 18.5 ± 0.3 | s. |
| 13.7 ± 0.2 | m. |
| 10.8 ± 0.2 | m. |
| 4.10 ± 0.06 | v.s. |
| 3.68 ± 0.08 | m. |
| 3.49 ± 0.05 | s. |
| 2.49 ± 0.02 | m. |
| 1.84 ± 0.01 | m. |

In a more preferred embodiment the X-ray diffraction patterns for these crystalline structures show at least the following significant lines:

| Interplanar Spacing d(A) | Relative Intensity |
|---|---|
| 20.1 ± 0.3 | v.s. |
| 9.97 ± 0.2 | m.-s. |
| 6.65 ± 0.1 | w. |
| 5.15 ± 0.08 | w. |
| 4.97 ± 0.06 | w.-m. |
| 4.70 ± 0.06 | w.-m. |
| 3.95 ± 0.05 | w. |
| 3.64 ± 0.04 | w.-m. |
| 3.53 ± 0.04 | w.-m. |
| 3.43 ± 0.03 | s. |
| 3.32 ± 0.03 | m. |
| 3.20 ± 0.03 | m. |
| 2.94 ± 0.02 | w. |
| 2.82 ± 0.02 | w. |

The mixture provided for in step (A) of the process of the invention is preferably prepared in three steps. First, the oxide of silicon source and the synthesis directing agent are mixed in water to provide a first mixture. This first mixture is preferably a colloidal dispersion. Second, the nitrogen containing organic dye is mixed with water to provide a second mixture. This second mixture is usually in the form of a dispersion or solution. The mineralizing agent is added to the second mixture. Third, these first and second mixtures are mixed together to form a third mixture.

This third mixture which is in the form of a gel is the mixture called for in step (A) of the inventive method. Stirring or agitation is generally required to effect a homogeneous mixture. The $OH^-$ to Si mole ratio is preferably in the range of about 0.1 to about 10. The $H_2O$ to $OH^-$ mole ratio is preferably in the range of about 10 to about 1000. The Si to mineralizing agent mole ratio is preferably in the range of about 0.1 to about 50. The Si to organic dye mole ratio is in the range of about 5 to about 100, preferably about 10 to about 60.

The oxide of silicon source can be any source that provides silicon oxide, hydroxide or alkoxide. Such sources include silica gel, silicic acid, silica sol and the silicates. Included within the silicates are the alkali and alkaline earth metal silicates with sodium silicate and potassium silicate being preferred. The alkoxides include those alkoxides of up to about 10, preferably up to about 6 carbon atoms. The silica sols are aqueous colloidal dispersions containing colloidal silica particles. The solids content of these colloidal dispersions generally ranges up to about 70% by weight, and is preferably in the range of about 5% to about 50%. These dispersions usually include an effective amount of an anionic (e.g., acetate, halogen, etc.) or cationic (e.g., alkali metal, ammonium, etc.) stabilizing agent to stabilize the dispersion. Generally the level of addition of such stabilizing agents is up to about 10% by weight of the solids in the dispersion. A commercially available silica sol that is particularly useful is Ludox AS-40 which is a product of DuPont identified as an ammonium stabilized silica sol containing 40% by weight silica.

The mineralizing agent is an alkali or alkaline earth metal compound. These compounds include the oxides, hydroxides, inorganic salts (e.g., nitrates, sulfates, phosphates, halides, carbonates and the like) as well as the organic salts, (e.g., acetates, formates, butyrates, propionates, benzylates and the like). A preferred mineralizing agent is sodium hydroxide.

The synthesis directing nitrogen containing organic dye can be an oxide, hydroxide, inorganic salt (e.g., nitrates, phosphates, halides, carbonates and the like), organic salt (e.g., acetates, formates, butyrates, propionates, benzylates and the like) or metal complex salt (e.g., $ZnCl_4{}^{2-}$). The dye cations are aromatic in character, generally have a planar geometry, and have a cationic charge of +1, +2, +3 or +4. Examples of these dyes include the viologens, methyl green, ethyl green, methylene blue, methylene green, methyl violet, methyl violet 2B and alcian blue. The viologens include methyl viologen, ethyl viologen, benzyl viologen and betaine viologen.

In a preferred embodiment the synthesis directing dye is represented by the formula

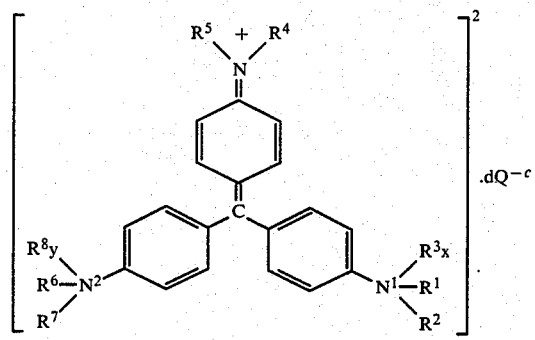

wherein: $N^1$ has a charge of +1 or a neutral charge; $N^2$ has a charge of +1 or a neutral charge; x is zero when $N^1$ has a neutral charge; and is 1 when $N^1$ has a +1 charge; y is zero when $N^2$ has a neutral charge, and is 1 when $N^2$ has a +1 charge; $R^1$, $R^2$, $R^3$, $R^4$, $R^5$, $R^6$ and $R^7$ are independently hydrogen or alkyl groups of 1 to about 10 carbon atoms; z is 1+x+y; Q is an anion of charge c; and d is z/c. $R^1$, $R^4$, $R^5$ and $R^6$ are preferably methyl. $R^2$ and $R^7$ are preferably independently hydrogen, methyl or ethyl. $R^3$ and $R^8$ are preferably methyl. Q is preferably a halide, phosphate, nitrate, carbonate, acetate, formate or butyrate. Alternatively Q is represented by the formula $EX_4$ wherein E is selected from the group consisting of Al, Zn, Cd, Hg, Ga, Pd, Pt, Fe, Cr, Mn, Co or Ni, and X is selected from the group consisting of Cl, F, Br, I or CN. An example of such a dye is methyl green.

In another preferred embodiment the synthesis directing dye is the salt of a cation of the formula

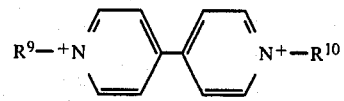

wherein $R^9$ and $R^{10}$ are independently hydrocarbon groups of 1 to about 10 carbon atoms. Either or both $R^9$ and $R^{10}$ can be independently aliphatic (e.g., alkyl of 1 to about 10 carbon atoms, preferably methyl) or aromatic (e.g., benzyl). The anionic portion of such salt can be halide, phosphate, nitrate, carbonate, acetate, formate or butyrate. An example of such a dye is methyl viologen.

In the method of the present invention, the mixture provided for in step (A) containing water, the oxide of silicon source, mineralizing agent and synthesis directing organic dye is preferably in the form of a gel. This gel is thoroughly mixed to homogenize the gel and placed in a reactor. The reactor is preferably an enclosed reactor (e.g., a static bomb style reactor). The contents are heated to a temperature in the range of about 80° C. to about 300° C., preferably about 125° C. to about 200° C., for an effective period of time to provide the desired silica molecular sieve, preferably about 4 hours to about 30 days, more preferably about one to about fifteen days. The pressure within the reactor is preferably at at least the vapor pressure of water at the temperature of the reactor contents. The contents of the reactor are then allowed to cool to room temperature. The crystalline solids are separated from the mother liquor and washed thoroughly with water. Separation can be effected by conventional filtration techniques. The solids can also be washed with an organic solvent, e.g., acetone. The crystalline solids are then allowed to dry in air, such solids being the desired silica molecular sieves of the invention.

The silica molecular sieves can be heat treated at a temperature of about 300° C. to about 900° C., preferably about 400° C. to about 600° C. in an inert, oxidizing or reducing atmosphere for a sufficient time to pyrolyze any synthesis directing agent intermixed with such silica molecular sieves. The time period for this heat treating step is dependent upon the mass of material being treated. Preferably the heat treating step is conducted for material being treated. Preferably the heat treating step is conducted for at least about 30 minutes, but this time period can be more or less than 30 minutes depending upon the mass of material being treated. The inert atmosphere is preferably nitrogen, argon, helium or neon. The reducing atmosphere is hydrogen or a mixture of hydrogen and one of the above-indicated inert gases. The reducing atmosphere can thus contain from about 1% to about 100% hydrogen, preferably about 1% to about 20% hydrogen, with the remainder being inert gas. The oxidizing atmosphere can be oxygen or a mixture of oxygen and one of the above-indicated inert gases. The oxidizing atmosphere can thus contain from about 1% to about 100% oxygen, preferably from about 1% to about 20% oxygen with the remainder being inert gas. A preferred oxidizing atmosphere is air.

The silica molecular sieves of the invention can be cation exchanged with an ammonium salt, mineral acid or the salt of a catalytically active metal. The salt of the catalytically active metal is preferably the salt of a Group VIII, IB or IIB metal, with zinc, copper, nickel, cobalt and iron being preferred. The anionic portions of these salts are preferably inorganic and include the nitrates, phosphates, carbonates, silicates, aluminates and halogens. The cation exchange procedure employed herein is entirely conventional. Briefly, the silica molecular sieve and the ammonium salt or salt of catalytically active metal are dispersed in water for a few minutes to several hours, preferably about one to about ten hours, and maintained at about room temperature to about the boiling point of the water, then filtered and washed, with the result being the formation of the cation-exchanged silica molecular sieves. This procedure can be carried out once or repeatedly depending on the degree of exchange desired.

Optionally, the cation-exchanged silica molecular sieves can be heat treated in an inert, oxidizing or reducing atmosphere using the heat treating procedures described above to convert the cation-exchanged species to a more active form. This heat treating procedure is particularly suitable for driving off ammonia from an ammonium-silica molecular sieve to convert such molecular sieve to the acid form.

An advantage of the present invention is that the organic dyes employed herein do not tend to occlude within the silica molecular sieves produced herein. Since these organic dyes are relatively stable under the synthesis conditions employed herein and thus do not undergo significant breakdown during synthesis, it is possible to recycle these dyes or use them as "catalysts" in continuous processes.

The silica molecular sieves of the present invention can be used in many of the known applications for molecular sieves. The crystalline structure of these molecular sieves makes them particularly suitable as adsorbents and catalysts. The acid forms are suitable for cracking petroleum fractions and in dehydration reactions. Silica molecular sieves that have been cation exchanged with Group VIIIA metals are useful in converting synthesis gas to hydrocarbons and oxygenated hydrocarbons. The silica molecular sieves of the invention are also useful as ion exchangers for removing waste or valuable metal ions.

In order to further illustrate the present invention, the following examples are provided. Unless otherwise indicated, in the following examples as well as throughout the specification and in the claims, all parts and percentages are by weight, and all temperatures are in degrees Centigrade.

EXAMPLE 1

15.2 parts of Ludox AS-40 were added to a polypropylene beaker to provide a first mixture. 1.0 parts of methyl violet 2B were mixed with 4.4 parts of water with stirring in another polypropylene beaker to form a second mixture. 2.4 parts of a 50% sodium hydroxide solution were added with stirring to the second mixture. The two mixtures were mixed together with the result being the formation of a gel. The gel was stirred to homogenize the gel. A 9.6 part sample of the gel was placed in a Teflon-lined stainless steel bomb. The bomb was placed in an oven at a temperature of 150° C. The sample was removed after 4 days. The crystalline solids were separated from the mother liquor by filtering. The solids were washed in water and acetone to remove excess dye, then dried in air. The crystalline sample had a magadiite-like structure. The elemental analysis for the crystalline sample was as follows: 33% Si; 1.0% Na; and 0.028% Al. The mole ratios were: Si/Na=27; and Si/Al=1110. The crystalline sample had the following X-ray diffraction pattern:

| Interplanar Spacing d(A) | Relative Intensity |
|---|---|
| 15.65 | v.s. |
| 7.78 | m. |
| 5.18 | m. |
| 4.24 | w. |
| 4.10 | w. |
| 3.64 | w. |
| 3.55 | m. |
| 3.44 | s. |
| 3.31 | m. |
| 3.15 | s. |
| 2.82 | w. |
| 2.34 | w. |
| 1.83 | w. |

EXAMPLE 2

The crystalline sample from Example 1 was heat treated in air for 3 hours at 400° C. The recovered solid exhibited the following X-ray diffraction pattern:

| Interplanar Spacing d(A) | Relative Intensity |
|---|---|
| 13.65 | w. |
| 9.29 | v.s. |
| 6.89 | m. |
| 6.59 | w. |
| 6.36 | w. |
| 5.54 | m. |
| 4.97 | m. |
| 4.51 | m. |
| 4.29 | s. |
| 3.99 | w. |
| 3.83 | m. |
| 3.55 | m. |
| 3.47 | m. |
| 3.41 | m. |
| 3.27 | m. |
| 3.21 | m. |
| 3.14 | w. |
| 2.95 | w. |
| 2.90 | s. |
| 2.86 | m. |
| 2.57 | w. |

EXAMPLE 3

22.8 parts of Ludox AS-40 were added to a polypropylene beaker to provide a first mixture. 1.17 parts of alcian blue were mixed with 6 parts of water in another polypropylene beaker to form a second mixture. 3.9 parts of a 50% sodium hydroxide solution were added to the second mixture. The two mixtures were mixed together with the result being the formation of a gel. The gel was stirred to homogenize the gel. The $SiO_2$ to alcian blue mole ratio was 169. The $SiO_2$ to water mole ratio was 0.126. The $SiO_2$ to NaOH mole ratio was 3.095. A 9 part sample of the gel was placed in a Teflon-lined stainless steel bomb. The bomb was placed in an oven at a temperature of 150° C. The sample was removed after 4 days. The solids were recovered from the mother liquor by filtering. The solids were washed in water and acetone to remove excess dye, then dried in air. The X-ray diffraction pattern for this sample was similar to natural layered silicate magadite and the phase identified as $SiO_2$-Y. The X-ray diffraction pattern for the sample exhibited the following significant lines:

| Interplanar Spacing d(A) | Relative Intensity |
| --- | --- |
| 15.6 | v.s. |
| 7.77 | w. |
| 5.20 | m. |
| 4.30 | w. |
| 4.10 | m. |
| 3.64 | m. |
| 3.56 | m. |
| 3.43 | v.s. |
| 3.32 | s. |
| 3.16 | s. |
| 2.82 | w. |
| 2.64 | w. |
| 2.54 | w. |
| 2.50 | w. |
| 2.35 | w. |
| 1.83 | w. |

EXAMPLE 4

The crystalline sample from Example 3 was heat treated in air at 550° C. for 2.5 hours. The recovered solid exhibited the following X-ray diffraction lines in addition to those of alpha quartz:

| Interplanar Spacing d(A) | Relative Intensity |
| --- | --- |
| 17.0 | m. |
| 11.5 | m. |
| 7.55 | w. |
| 4.22 | m. |
| 4.12 | v.s. |
| 4.00 | m. |
| 3.73 | m. |
| 3.41 | s. |
| 2.86 | w. |
| 2.50 | m. |
| 2.05 | w. |
| 1.86 | w. |

EXAMPLE 5

15.2 parts of Ludox AS-40 were added to a polypropylene beaker to provide a first mixture. 1.35 parts of methylene blue were mixed with 4.0 parts of water with stirring in a second polypropylene beaker to form a second mixture. 2.62 parts of 50% sodium hydroxide solution were added to the second mixture. The two mixtures were combined resulting in the formulation of a gel. The gel was stirred to homogenize the gel. The $SiO_2$ to methylene blue mole ratio was 28.0. The $SiO_2$ to water mole ratio was 0.126. The $SiO_2$ to Na mole ratio was 3.10. A 9 part sample of the gel was placed in a Teflon lined stainless steel bomb. The bomb was placed in an oven at 150° C. for 6 days. The solids were recovered from the mother liquor by filtering. The solids were washed thoroughly in water and acetone, then dried in air. The X-ray diffraction pattern of the recovered solids exhibited lines similar to those of a phase known as $SiO_2$-X, in addition to those associated with an alpha quartz impurity of less than 20%. The X-ray diffraction pattern was as follows:

| Interplanar Spacing d(A) | Relative Intensity |
| --- | --- |
| 18.5 | s. |
| 13.7 | m. |
| 10.8 | m. |
| 9.1 | w. |
| 6.5 | w. |
| 4.10 | v.s. |
| 3.68 | m. |
| 3.49 | s. |
| 2.49 | m. |
| 2.34 | w. |
| 2.03 | w. |
| 1.84 | m. |

EXAMPLE 6

21.1 parts of Ludox AS-40 were added to a polypropylene beaker to provide a first mixture. 1.1 parts of methyl viologen were mixed with 4.4 parts of water with stirring in another polypropylene beaker to form a second mixture. 2.2 parts of a 50% sodium hydroxide solution were added to the second mixture. The two mixtures were mixed together with the result being the formation of a gel. The gel was stirred to homogenize the gel. The $SiO_2$ to methyl viologen mole ratio was 18.83. The $SiO_2$ to water mole ratio was 0.114. The $SiO_2$ to NaOH mole ratio was 2.93. A 9 part sample of the gel was placed in a Teflon-lined stainless steel bomb. The bomb was placed in an oven at a temperature of 150° C. The sample was removed after 5 days. The solids were recovered from the mother liquor by filtering. The solids were washed in water and acetone to remove excess dye, then dried in air. The X-ray diffraction pattern did not contain any reflections suggestive of quartz. Many of the lines in the pattern matched up well with natural layered silicate magadiite and the phase identified as $SiO_2$-Y. The crystalline solids had the following analysis: 34% Si; 0.031% Al; and 2.9% Na. The mole ratios for these solids were: Si/Al=1210; and Si/Na=9.6. The crystalline solids exhibited the following X-ray diffraction pattern:

| Interplanar Spacing d(A) | Relative Intensity |
| --- | --- |
| 15.66 | v.s. |
| 7.78 | w. |
| 7.30 | w. |
| 5.93 | w. |
| 5.83 | w. |
| 5.66 | w. |
| 5.32 | m. |
| 5.17 | m. |
| 4.98 | m. |
| 4.31 | m. |
| 4.10 | s. |
| 3.64 | w. |
| 3.55 | w. |
| 3.44 | s. |
| 3.35 | w. |
| 3.30 | m. |
| 3.20 | w. |
| 3.15 | m. |
| 2.49 | w. |

EXAMPLE 7

15.2 parts of Ludox AS-40 were added to a polypropylene beaker to provide a first mixture. 1.55 parts of methyl green were mixed with 4.4 parts of water with stirring in another polypropylene beaker to form a second mixture. 2.4 parts of a 50% sodium hydroxide solution were added to the second mixture. The two mixtures were mixed together with the result being the formation of a gel. The gel was stirred to homogenize the gel. The $SiO_2$ to methyl green mole ratio was 19.80. The $SiO_2$ to water mole ratio was 0.127. The $SiO_2$ to NaOH mole ratio was 3.37. Two 9 part samples of the gel were placed in Teflon-lined stainless steel bombs. The bombs were placed in an oven at a temperature of 150° C. The samples were removed after 5 and 12 days. The solids were recovered from the mother liquor by filtering. The solids were washed in water and acetone to remove excess dye, then dried in air. The X-ray diffraction pattern for the 5-day sample appeared to be very similar to patterns reported for magadiite. The 5-day sample had the following elemental analysis: 33% Si; 0.023% Al; and 4.8% Na. The mole ratios for this sample were: Si/Al=1300; and Si/Na=5.6. The carbon and nitrogen analysis of this sample indicated a less than 1.45% dye content resulting in a Si/dye mole ratio of greater than 490. The 5-day sample exhibited the following X-ray diffraction pattern:

| Interplanar Spacing d(A) | Relative Intensity |
|---|---|
| 15.60 | v.s. |
| 7.78 | w. |
| 7.27 | w. |
| 5.65 | w. |
| 5.56 | w. |
| 5.18 | m. |
| 5.01 | w. |
| 4.69 | w. |
| 4.53 | w. |
| 4.47 | w. |
| 4.01 | w. |
| 3.89 | w. |
| 3.63 | w. |
| 3.56 | m. |
| 3.44 | s. |
| 3.30 | m. |
| 3.21 | w. |
| 3.15 | m. |
| 3.10 | w. |
| 2.90 | w. |
| 2.86 | w. |
| 2.82 | w. |
| 2.59 | w. |
| 2.35 | w. |

The 12-day sample exhibited an X-ray diffraction pattern indicating the presence of alpha quartz impurity of less than 20% and a phase with similar lines to those of the naturally occurring mineral kenyaite. The 12-day sample had the following elemental analysis: 35% Si; 0.031% Al; and 3.1% Na. The mole ratios for the 12-day sample were Si/Al=1250; and Si/Na=9.3. The X-ray diffraction pattern exhibited the following significant lines in addition to those of alpha quartz:

| Interplanar Spacing d(A) | Relative Intensity |
|---|---|
| 20.09 | v.s. |
| 9.97 | m. |
| 7.31 | w. |
| 6.65 | w. |
| 5.15 | w. |
| 4.97 | w. |
| 4.70 | w. |
| 4.09 | w. |
| 4.03 | w. |
| 3.93 | w. |
| 3.88 | w. |
| 3.64 | w. |
| 3.53 | w. |
| 3.43 | s. |
| 3.32 | m. |
| 3.20 | m. |
| 2.94 | w. |
| 2.82 | w. |

EXAMPLE 8

0.91 parts of the 5-day crystalline sample from Example 7 were heat treated in air at 550° C. for 3 hours. A weight loss of 15.8% was observed. The X-ray diffraction pattern of the heat treated sample exhibited the following significant lines:

| Interplanar Spacing d(A) | Relative Intensty |
|---|---|
| 15.5 | s. |
| 3.68 | m. |
| 3.59 | m. |
| 3.41 | v.s. |
| 3.18 | m. |
| 1.84 | m. |

EXAMPLE 9

0.75 parts of the 5-day crystalline sample from Example 7 were washed in 20 ml. of 0.6N HCl acid for four hours at room temperature. The crystalline solids were removed by filtration and thoroughly washed with water, then dried. The X-ray diffraction pattern for these crystalline solids exhibited the following significant lines:

| Interplanar Spacing d(A) | Relative Intensity |
|---|---|
| 11.6 | v.s. |
| 10.2 | m. |
| 9.0 | m. |
| 5.6 | w. |
| 3.68 | s. |
| 3.59 | v.s. |
| 3.42 | v.s. |
| 3.21 | s. |
| 2.67 | w. |
| 2.21 | w. |
| 1.85 | m. |

While the invention has been explained in relation to its preferred embodiment, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for making a silica molecular sieve using a nitrogen-containing organic dye, said silica molecular sieve being represented in terms of mole ratios of oxides by the formula

$aAO_{n/2}:xM_2O:yAl_2O_3:100SiO_2:bH_2O$ wherein

A is the cation of said organic dye;
M is an alkali metal;
a is from zero to about 2;
n is the cationic charge of A;
b is from about 20 to about 90;
x is from about about zero to about 15; and
y is from zero to about 2;
said process comprising the following steps:
(A) providing a mixture comprising: water; an oxide of silicon source; a mineralizing agent selected from the group consisting of alkali and alkaline earth metal compounds; and said nitrogen containing organic dye; the mole ratio of OH$^-$ to Si being in the range of about 0.1 to about 10, the mole ratio of Si to mineralizing agent being in the range of about 0.1 to about 50, and the mole ratio of Si to organic dye being in the range of about 5 to about 50;

said organic dye being a substituted benzylidene compound represented by the formula (I)

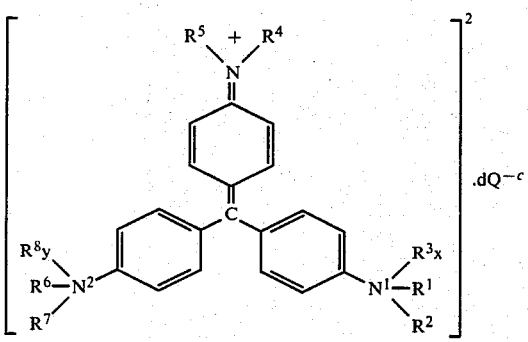

wherein
$N^1$ has a charge of +1 or a neutral charge;
$N^2$ has a charge of +1 or a neutral charge;
x is zero when $N^1$ has a neutral charge, and is 1 when $N^1$ has a +1 charge;
y is zero when $N^2$ has a neutral charge, and is 1 when $N^2$ has a +1 charge;
$R^1$, $R^2$, $R^3$, $R^4$, $R^5$, $R^6$ and $R^7$ are independently hydrogen or alkyl groups of 1 to about 10 carbon atoms;
z is 1+x+y;
Q is an anion of charge c; and
d is z/c; or said organic dye being the salt of a cation of the formula(II)

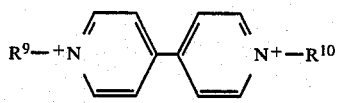

wherein
$R^9$ and $R^{10}$ are independently hydrocarbon groups of from 1 to about 10 carbon atoms; or said organic dye being selected from the group consisting of methylene blue, methylene green or alcian blue; and
(B) maintaining said mixture at a temperature of about 80° C. to about 300° C. for an effective period of time to provide said silica molecular sieve.

2. The method of claim 1 wherein A is the cation of methyl viologen, ethyl viologen, benzyl viologen, betaine viologen, methyl green, ethyl green, methylene green, methylene blue, methyl violet, methyl violet 2B or alcian blue.

3. The method of claim 1 wherein M is Na or K.

4. The method of claim 1 wherein M is Na.

5. The method of claim 1 wherein a is from zero to about 1.

6. The method of claim 1 wherein b is from about 30 to about 80.

7. The method of claim 1 wherein x is from about zero to about 10.

8. The method of claim 1 wherein y is from zero to about 0.5.

9. The method of claim 1 wherein n is in the range of 1 to 4.

10. The method of claim 1 wherein said organic dye is said substituted benzylidene compound (I), said salt of a cation of the formula (II) of said alcian blue, said period of time for step (B) is in the range of from about one to about fifteen days, the X-ray diffraction pattern for said silica molecular sieve shows at least the following significant lines:

| Interplanar Spacing d(A) | Relative Intensity |
|---|---|
| 15.65 ± 0.2 | v.s. |
| 7.78 ± 0.1 | w. |
| 5.18 ± 0.06 | m. |
| 3.64 ± 0.04 | w.-m. |
| 3.56 ± 0.04 | w.-m. |
| 3.44 ± 0.04 | s.-v.s. |
| 3.31 ± 0.03 | m.-s. |
| 3.15 ± 0.03 | m.-s. |

11. The method of claim 1 wherein said organic dye is methylene blue or methylene green, the X-ray diffraction pattern for said silica molecular sieve shows at least the following significant lines:

| Interplanar Spacing d(A) | Relative Intensity |
|---|---|
| 18.5 ± 0.3 | s. |
| 13.7 ± 0.2 | m. |
| 10.8 ± 0.2 | m. |
| 4.10 ± 0.06 | v.s. |
| 3.68 ± 0.08 | m. |
| 3.49 ± 0.05 | s. |
| 2.49 ± 0.02 | m. |
| 1.84 ± 0.01 | m. |

12. The method of claim 1 wherein said organic dye is said substituted benzylidene compound (I), said salt of a cation of the formula (II) or said alcian blue, said period of time for step (B) ranging from about 4 hours to about 30 days, the X-ray diffraction pattern for said silica molecular sieve shows at least the following significant lines:

| Interplanar Spacing d(A) | Relative Intensity |
|---|---|
| 20.1 ± 0.3 | v.s. |
| 9.97 ± 0.2 | m.-s. |
| 6.65 ± 0.1 | w. |
| 5.15 ± 0.08 | w. |
| 4.97 ± 0.06 | w.-m. |
| 4.70 ± 0.06 | w.-m. |
| 3.95 ± 0.05 | w. |
| 3.64 ± 0.04 | w.-m. |
| 3.53 ± 0.04 | w.-m. |
| 3.43 ± 0.03 | s. |
| 3.32 ± 0.03 | m. |

-continued

| Interplanar Spacing d(A) | Relative Intensity |
|---|---|
| 3.20 ± 0.03 | m. |
| 2.94 ± 0.02 | w. |
| 2.82 ± 0.02 | w. |

13. The method of claim 1 wherein the mixture provided for in step (A) is a gel, said gel being prepared by (i) providing a first mixture comprising a colloidal dispersion of silica, (ii) providing a second mixture comprising water, said organic dye and said mineralizing agent, and (iii) combining said first and second mixture to provide said gel.

14. The method of claim 1 wherein said organic dye is selected from the group consisting of the viologens, methyl green, ethyl green, methylene blue, methyl violet, methylene green, methyl violet 2B and alcian blue.

15. The method of claim 14 wherein said viologens are selected from the group consisting of methyl viologen, ethyl viologen, benzyl viologen and betaine viologen.

16. The method of claim 1 wherein $R^1$, $R^4$, $R^5$ and $R^6$ are methyl.

17. The method of claim 1 wherein $R^2$ and $R^7$ are independently hydrogen, methyl or ethyl.

18. The method of claim 1 wherein $R^3$ and $R^8$ are methyl.

19. The method of claim 1 wherein Q is a halide, phosphate, nitrate, carbonate, acetate, formate or butyrate.

20. The method of claim 1 wherein Q is represented by the formula $EX_4$ wherein E is selected from the group consisting of Al, Zn, Cd, Hg, Ga, Pd, Pt, Fe, Cr, Mn, Co or Ni, and X is selected from the group consisting of Cl, F, Br, I or CN.

21. The method of claim 1 wherein $R^9$ and $R^{10}$ are independently aliphatic or aromatic.

22. The method of claim 1 wherein $R^9$ and $R^{10}$ are alkyl groups of 1 to about 10 carbon atoms.

23. The method of claim 1 wherein $R^9$ and $R^{10}$ are benzyl.

24. The method of claim 1 wherein $R^9$ and $R^{10}$ are each methyl.

25. The method of claim 1 wherein said oxide of silicon source is silica sol.

26. The method of claim 1 wherein said mineralizing agent is an alkali or alkaline earth metal compound.

27. The method of claim 1 with the step of separating said silica molecular sieve from its mother liquor.

28. The method of claim 1 with the step of washing said silica molecular sieve.

29. The method of claim 1 with the step of cation exchanging said silica molecular sieve with an ammonium salt, mineral acid or a salt of a catalytically active metal to provide a cation exchanged silica molecular sieve.

30. The method of claim 29 with the step of heat treating said cation exchanged silica molecular sieve in an inert, oxidizing or reducing atmosphere.

31. The method of claim 1 with the step of heat treating said silica molecular sieve in an inert, oxidizing or reducing atmosphere.

32. The method of claim 31 with step of cation exchanging said heat treated silica molecular sieve with an ammonium salt, mineral acid, or a salt of a catalytically active metal to provide a cation exchanged silica molecular sieve.

33. The method of claim 32 with the step of heat treating said cation exchanged silica molecular sieve in an inert, oxidizing or reducing atmosphere.

34. The method of claim 1 wherein the mole ratio during step (A) of $H_2O$ to $OH^-$ is in the range of about 10 to about 1000.

35. The method of claim 1 wherein said mixture is maintained in an enclosed container under at least the vapor pressure of water during step (B).

36. The method of claim 1 wherein the temperature during step (B) is in the range of about 125° C. to about 200° C.

37. The method of claim 1 wherein the time period for step (B) is from about 4 hours to about 30 days.

38. The method of claim 1 wherein the time period for step (B) is from about one to about fifteen days.

* * * * *